(No Model.)

P. L. KIMBALL.
CENTRIFUGAL MACHINE.

No. 553,491. Patented Jan. 21, 1896.

Witnesses:
John Buckler,
A. C. Tanner.

Inventor
Perley L. Kimball
By Simonds, Burdett & Frothingham
his Attorneys.

UNITED STATES PATENT OFFICE.

PERLEY L. KIMBALL, OF BELLOWS FALLS, VERMONT, ASSIGNOR TO THE VERMONT FARM MACHINE COMPANY, OF SAME PLACE.

CENTRIFUGAL MACHINE.

SPECIFICATION forming part of Letters Patent No. 553,491, dated January 21, 1896.

Application filed March 21, 1894. Serial No. 504,494. (No model.)

*To all whom it may concern:*

Be it known that I, PERLEY L. KIMBALL, of Bellows Falls, in the county of Windham and State of Vermont, have invented a certain new and useful improvement in centrifugal machines used for separating liquids of different densities, and specially applicable to the separation of cream from milk, of which the following is a description, reference being had to the accompanying drawings, wherein—

Figure 1:
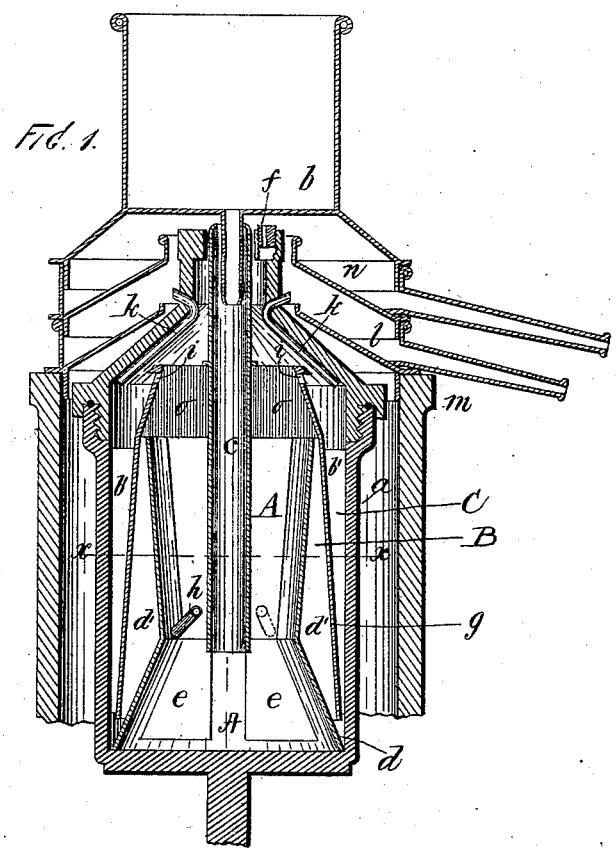
Figure 2:
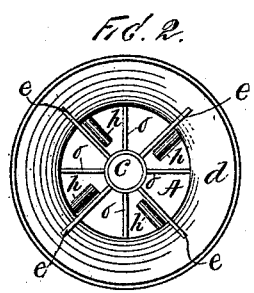
Figure 3:
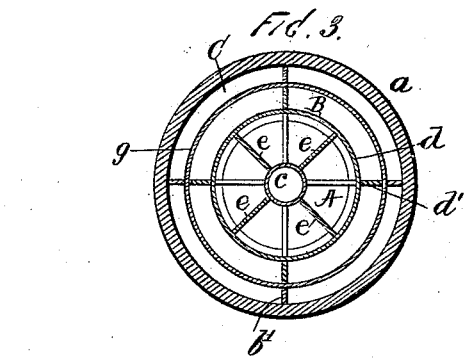

Figure 1 is a view of a mechanism embodying said improvement in central vertical section. Fig. 2 is a view looking into the lower end of the first separating-chamber. Fig. 3 is a view in horizontal section on plane $x\ x$, looking upward.

The construction and operation of this machine will be herein described as applicable to the separation of cream from new or whole milk.

The whole milk may enter the rotary separating-bowl $a$ by gravity from the feed-vessel $b$. The feed-tube $c$ conducts the milk downwardly and delivers it near the bottom of the first separating-chamber, A, the floor of which is, or may be, formed by the floor of the bowl $a$. The wall $d$ of this first separating-chamber is at the lower part enlarged downwardly. From the wall $d$ there are wings $e$ projecting inwardly, which cause the liquid to rotate as the chamber rotates with the bowl. The effect of the centrifugal force upon the liquid in this chamber is to drive the largest and most buoyant of the cream globules inward to or toward the axis of rotation, where they form a central cream mass that lengthens upwardly as the milk continues its inflow, until the cream finally escapes from the separator-bowl through the cream-outlet $f$ into the annular cream-pan $n$. The cream thus seeks the axis of rotation, because the more watery portions of the milk, under the stress of the centrifugal force acting on their greater specific gravity, seek the wall $d$ and displace the cream therefrom. Such more watery portion of the liquid when it strikes the wall $d$ finds no mode of escape except upwardly, so that it is forced to climb the wall $d$ of the chamber A until it reaches the top thereof, when, under centrifugal force, it passes into the second separating-chamber, B, whose outer wall $g$ expands downwardly, wherefore the liquid takes a downward course in this second chamber. Here the centrifugal action, insured by wings $d'$ on the back of wall $d$, is stronger than in the first separating-chamber because of the larger diameter of the second separating-chamber, so that other cream globules are detached from the more watery portions of the liquid. Seeking the axis of rotation they escape through pipes $h$, fixed to and penetrating wall $d$, into and join the cream mass in the center of the first chamber.

At the lower end of the wall $g$ there is an opening all around through which the liquid escapes into the third separating-chamber, C, which has a still larger diameter than chamber B, giving still further increase of force of centrifugal action, insured by wings $b'$, so that while the liquid is rising in this third chamber somewhat further separation of cream from the more watery liquid takes place, and the cream, seeking the axis of rotation, rises along the inner wall of this third chamber, and, through the passages $i$, penetrating the upper part of wall $g$, joins the central cream mass of the first chamber.

The upper part of wall $g$ is narrowed inwardly and upwardly more sharply than below, over the end of the wall $d$, in order to insure the immediate downward start of the liquid in the chamber B.

In the third chamber, C, the milk (now containing little or no cream) rises along the outer wall, and through pipes $k$ escapes into the annular milk-pan $l$, which rests upon the outer casing $m$. The annular milk-pan $l$ supports the annular cream-pan $n$, which in turn supports the feed-vessel $b$. The wall $d$ rests on the floor of the bowl $a$. The wall $g$ rests by means of wings $o$ on the top of wall $d$. The wings $e$ and $o$ bear on the exterior of tube $c$. This construction preserves all three of these parts in proper relation to each other and permits them to be disassociated for cleansing purposes.

I claim as my improvement—

1. In combination, the separator bowl, the feed-tube delivering near the bottom of the bowl, the circular partition $d$ downwardly enlarged at its lower part, the cream pipes $h$ piercing the partition $d$ where said downward enlargement begins, and the outer circular partition *g*, all substantially as described and for the purposes set forth.

2. In combination, the separator bowl, the feed-tube delivering near the bottom of the bowl, the circular partition *d* enlarging both upwardly and downwardly, and the cream pipes *h* piercing the partition *d* between said enlargements, all substantially as described and for the purposes set forth.

PERLEY L. KIMBALL.

Witnesses:
A. J. HOLLEY,
FRANK G. DAY.